E. Averill.
Vibrating Propeller.
N° 98,217.    Patented Dec. 28, 1869.
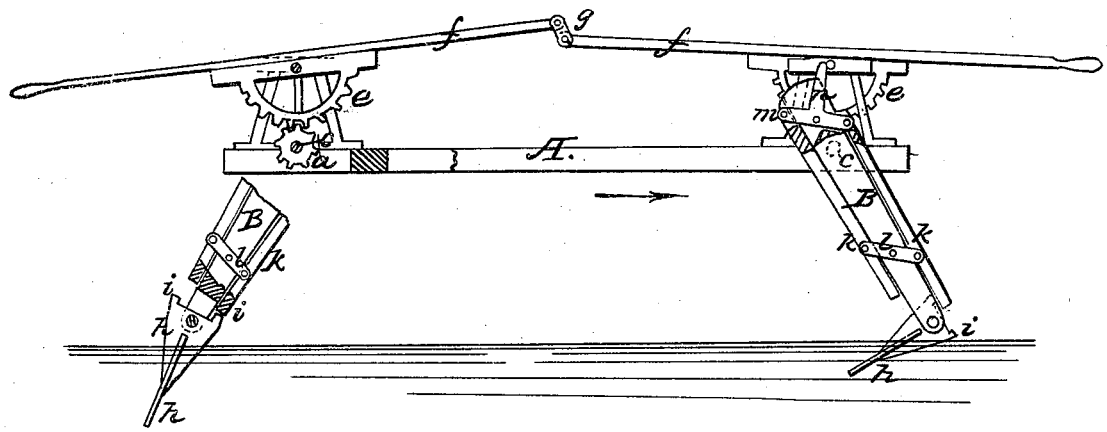
Witnesses.    Inventor.

United States Patent Office.

E. AVERILL, OF SACRAMENTO, CALIFORNIA.

Letters Patent No. 98,217, dated December 28, 1869.

IMPROVEMENT IN PROPELLING-APPARATUS.

The Schedule referred to in these Letters Patent and making part of the same.

To all whom it may concern:

Be it known that I, E. AVERILL, of Sacramento, in the county of Sacramento, and State of California, have invented a new and improved Propelling-Apparatus; and I do hereby declare that the following is a full, clear, and exact description thereof, which will enable others skilled in the art to make and use the same, reference being had to the accompanying drawing, forming part of this specification.

This invention relates to improvements in feathering paddles for boats and operating devices for the same, having for its object to provide an improved arrangement of means for feathering the paddles, and for operating a pair for one side of a boat alternately, also for reversing them for propelling in either direction.

The drawing represents an elevation of my improved paddling-device, with some parts broken away.

On a frame, A, adapted for suspension from the thwarts of a vessel, I suspend a pair of vibrating paddle-supporting arms, B, on axles C.

These axles are provided with pinions $d$, and the latter gear with segmental wheels $e$, connected to operating levers $f$, which I prefer to connect together, as at $g$, by a connection which admits of free vibration.

To the lower ends of these arms B, I pivot paddles $h$, having shoulders $i$ before and behind the pivot bolt, projecting slightly above it.

$k$ represents slides, working on two sides of the paddle-arms, fore and aft, connected by links $l\ m$, pivoted to the arms. The links $m$ have tongues $n$ projecting upward from the centre, by which these slides may be worked up and down on the arms, one moving up when the other moves down. They are also secured in any position by these tongues.

When the vessel is to be propelled in the direction of the arrow, the slides on the sides in the said direction are adjusted downward, so that when the arms move backward to beat the water, the shoulders $i$ will strike against the ends of the slides, and be thereby held in the right position, as shown at the left of the drawing, but when moving the other way, the paddle is free to swing backward, so as to be drawn through the water edgewise, as shown at the right of the drawing.

For propelling the vessel in the other direction, the slides $k$ are reversed in position by turning the links $m$.

This improved propelling-device may be operated by a crank-shaft, connected in any preferred way with the arms $f$ or the link $g$, by which they are connected, or it may be connected to cranks on the pinion-shafts, or the shafts of the segment wheels $e$, by suitable connecting-rods.

Having thus described my invention,

What I claim as new, and desire to secure by Letters Patent, is—

1. The vibrating arms B, hinged paddles and reversible slides $k$, combined and arranged substantially as specified.

2. The combination of the vibrating arms B, pinions $d$, wheels $e$, and levers $f$, substantially as specified.

The above specification of my invention, signed by me, this 15th day of April, 1869.

E. AVERILL.

Witnesses:
S. HAINES,
E. McCARTY.